United States Patent
Mårdell

(10) Patent No.: US 9,104,984 B2
(45) Date of Patent: Aug. 11, 2015

(54) METHOD AND DEVICE RELATING TO INFORMATION MANAGEMENT

(75) Inventor: Anders Mårdell, Sollentuna (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1504 days.

(21) Appl. No.: 12/270,155

(22) Filed: Nov. 13, 2008

(65) Prior Publication Data
US 2010/0119123 A1    May 13, 2010

(51) Int. Cl.
*G06F 17/00* (2006.01)
*G06Q 10/00* (2012.01)

(52) U.S. Cl.
CPC .................. *G06Q 10/00* (2013.01)

(58) Field of Classification Search
CPC .................................. G06F 3/0484
USPC ................. 715/273, 200, 243, 202
See application file for complete search history.

(56) References Cited

U.S. PATENT DOCUMENTS

| | | | |
|---|---|---|---|
| 6,282,317 B1 * | 8/2001 | Luo et al. | 382/203 |
| 7,171,113 B2 * | 1/2007 | Parulski et al. | 396/287 |
| 7,197,158 B2 * | 3/2007 | Camara et al. | 382/100 |
| 7,519,200 B2 * | 4/2009 | Gokturk et al. | 382/118 |
| 7,609,958 B2 * | 10/2009 | Border et al. | 396/89 |
| 7,760,905 B2 * | 7/2010 | Rhoads et al. | 382/100 |
| 7,840,892 B2 * | 11/2010 | Pyhalammi et al. | 715/230 |
| 7,945,653 B2 * | 5/2011 | Zuckerberg et al. | 709/223 |
| 8,571,272 B2 * | 10/2013 | Gokturk et al. | 382/118 |
| 8,788,493 B2 * | 7/2014 | Stallings et al. | 707/736 |
| 2002/0065844 A1 * | 5/2002 | Robinson et al. | 707/500 |
| 2004/0123131 A1 * | 6/2004 | Zacks et al. | 713/200 |
| 2005/0162523 A1 | 7/2005 | Darrell et al. | |
| 2005/0212817 A1 * | 9/2005 | Cannon et al. | 345/619 |
| 2008/0240702 A1 | 10/2008 | Wassingbo et al. | |
| 2009/0093275 A1 * | 4/2009 | Oh et al. | 455/566 |
| 2009/0189920 A1 * | 7/2009 | Chiu et al. | 345/662 |
| 2009/0316961 A1 * | 12/2009 | Gomez Suarez et al. | 382/118 |
| 2010/0060647 A1 * | 3/2010 | Brown et al. | 345/473 |
| 2010/0076976 A1 * | 3/2010 | Sotirov et al. | 707/737 |

FOREIGN PATENT DOCUMENTS

WO    WO 2004/066613 A2    8/2004

OTHER PUBLICATIONS

International Search Report and Written Opinion issued in corresponding international application No. PCT/EP2009/055761, mailed on Aug. 31, 2009, 9 pages.

* cited by examiner

Primary Examiner — Manglesh M Patel
(74) Attorney, Agent, or Firm — Harrity & Harrity, LLP

(57) ABSTRACT

A method and an arrangement for use in a device, such as a communication device, may be configured to generate an assembly based on one or more images. The system may include an image retrieval portion for retrieving the one or more images from an image source, an arrangement for fetching data corresponding to the one or more images, and converting the data to presentable information, and an arrangement for generating the assembly including the one or more images and the presentable information provided with description.

25 Claims, 5 Drawing Sheets

METHOD AND DEVICE RELATING TO INFORMATION MANAGEMENT

TECHNICAL FIELD

The present invention generally relates to an arrangement for generating a presentation.

BACKGROUND OF THE INVENTION

It is common for devices that handle photographs, e.g., mobile communication devices, to have some sort of slide-show mode where the pictures are automatically presented. That kind of presentation is very straight forward and contains relatively little information beside the actual pictures.

SUMMARY OF THE INVENTION

Embodiments of the invention may enhance a photograph presentation by using information that can be extracted from the photo and with other available information in a mobile device that can be related to the photographs. This will enhance the presentation and expand the experience far beyond that of a simple slideshow of pictures. The presentation will also include more useful information about the images shown in the presentation.

Embodiments of the invention may provide users with a simple way to generate and send a Multimedia Messaging Service (MMS) including a presentation by allowing the user to select one or more images and create an MMS presentation of those.

Moreover, embodiments of the invention can be used as a default presentation mode when browsing the image media in a mobile device.

In this regard, an arrangement for use in a device is provided. The arrangement may be configured to generate an assembly based on one or more images. The arrangement may include: an image retrieval portion for retrieving the one or more images from an image source, an arrangement for fetching data corresponding to the one or more images and converting the data into presentable information, and an arrangement to generate the assembly that includes the one or more images and the presentable information provided with description, e.g., annotation.

For example, the data may include one or more items of metadata in the one or more images, information in the device based on, for example, date and time, or information extracted from the one or more images. For example, the metadata may include one or more photo parameters, such as time, date, and/or position. The information in the device may include one or more of calendar information at a time for the one or more images' acquirement and/or distance measurement information. In one embodiment, the information extracted from the one or more images may include one or more of: face recognition, smile detection, posture recognition, and/or view recognition. The assembly of images may include audio and/or visual description of the one or more images.

Embodiments of the invention may relate to a communication device that may include a processing unit, a memory unit, a transceiver portion, a telephony application, a contact directory, a messaging application, a digital camera system, a photograph management application, and/or a content database. The device may include a portion for retrieving one or more images from the digital camera and/or the memory, a portion for fetching data corresponding to the one or more images and converting it to a presentable information, and/or a portion for generating an assembly including the one or more images and/or the presentable information provided with description. The device may include one or more of a face recognition portion, a portion for providing positioning information, a portion for providing calendar information, a step counter, an arrangement for generating a multimedia message based on the assembly, a gesture recognition portion, and/or a view detection portion.

Embodiments of the invention may relate to a method for enhanced presentation of one or more images, the method may include the steps of extracting data corresponding to the one or more images and converting the data to presentable information, and generating the presentation comprising the one or more images and the presentable information provided with description. For example, the data may include one or more of metadata in the one or more images, information in the device based on, for example, date and time, and/or information extracted from the one or more images. The metadata may include one or more of time, date, or position associated with capture of the one or more images. The method may include using information including one or more of calendar information at a time for the one or more images' acquirement or associated distance information. The information extracted from a content and/or subject matter of the one or more images may include one or more of face recognition, smile detection, posture recognition, and/or view recognition, and/or any other discernible characteristic. The assembly of images may include audio and/or visual description of the one or more images.

Embodiments of the invention may relate to a method of generating and transmitting a digital message including multimedia information including one or more images. The method may include the steps of extracting data corresponding to the one or more images and converting the data to presentable information, generating a presentation including the one or more images and the presentable information provided with description, and/or transmitting the presentation over a network.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

Figure 1:
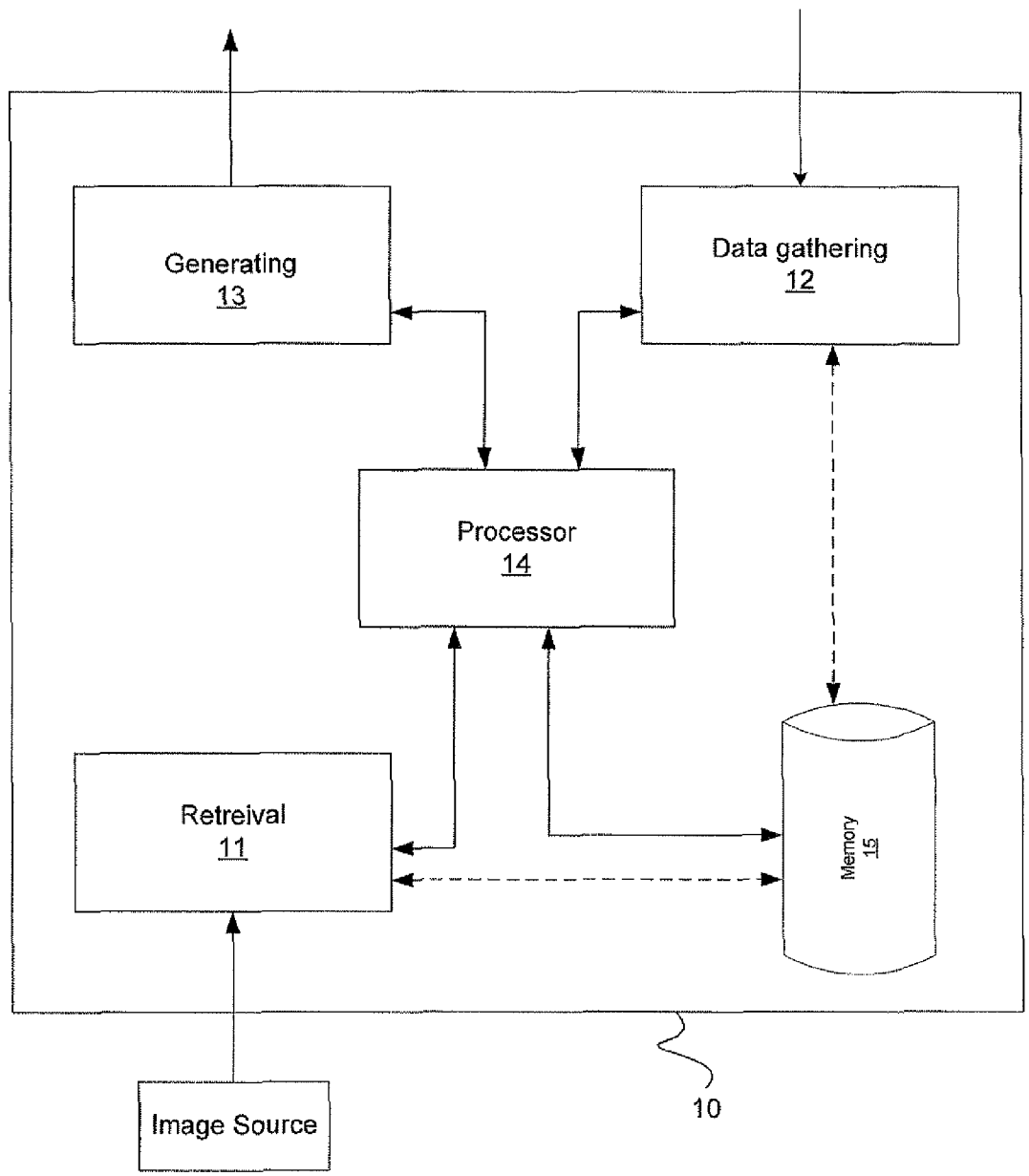
FIG. 1 is a diagram representing an exemplary arrangement according to one embodiment of the present invention.

The term "electronic equipment," as referred to herein, may include portable radio communication equipment. The term "portable radio communication equipment," also referred to herein as a "mobile radio terminal" or "mobile device," may include any equipment, such as mobile phones, communicators, for example, electronic organizers, personal digital assistants (PDAs), smart phones, or the like, and in some aspects, may also include digital cameras, digital video cameras, computers, etc.

Many of the elements discussed in this specification, whether referred to as a "system" a "module" a "circuit" or similar term, may be implemented in hardware circuit(s), a processor executing software code, or a combination of a hardware circuit and a processor executing code. As such, the term, circuit, as used throughout this specification, is intended to encompass a hardware circuit (whether discrete elements or an integrated circuit block), a processor executing code, or a combination of a hardware circuit and a processor executing code, or other combinations of the above known to those skilled in the art.

In the drawings, each element with a reference number may be similar to other elements with the same reference number independent of any letter designation following the reference number. In the text, a reference number with a specific letter designation following the reference number may refer to the specific element with the number and letter designation and a reference number without a specific letter designation may refer to all elements with the same reference number independent of any letter designation following the reference number in the drawings. The term, transceiver, as used throughout this specification, is intended to encompass a circuit for communication, for example, for receiving and/or transmitting signals, particularly radio signals. In the following, the term, presentation, generally implies assembling a number of images and providing the assembled images set with additional information for rendering to a viewer. The term, image, may include both photographs and motion pictures (e.g., video).

With reference to FIG. 1, an arrangement 10 for use in a device, such as a mobile phone, a digital camera, PDA, computer, or the like, is illustrated. Arrangement 10 may include a retrieval portion 11, a data gathering portion 12, a generating portion 13, and depending on the particular application, a processor or controller 14 and a memory unit 15. Image retrieval portion 11 may be configured for retrieving images from an image source, for example, an image recorder such as a digital camera or a storage unit on which the images are stored. Data gathering portion 12 may receive data from the device or other information sources as described below. Generating portion 13 may generate the presentation. Processor 14 may control the operation of retrieval portion 11, data gathering portion 12, and generating portion 13, and memory device or unit 15 may store instructions for processor 14 operations and data for retrieval portion 11, data gathering portion 12, and generating portion 13. If the arrangement is to be imbedded in a device having its own processing unit and memory, processor 14 and memory unit 15 may be omitted.

The data gathered by data gathering portion 12 may include one or more of metadata associated with the image(s), information from the device, For example, based on date and time associated with the capturing of the image, and/or information extracted from the image. The metadata may include one or more of time or date and, according to one aspect, position data associated with the image. The information in the device may include one or more of calendar information at a time for the one or more images' acquirement and/or a step-counter information associated with the capturing of the image. The information extracted from the image may include one or more of face recognition, smile detection, posture recognition, and/or view recognition information obtained for and associated with the image(s).

Clearly, some or all operations of retrieval portion 11, data gathering portion 12, and/or generating portion 13, may be executed by processor 14.

Figure 5:
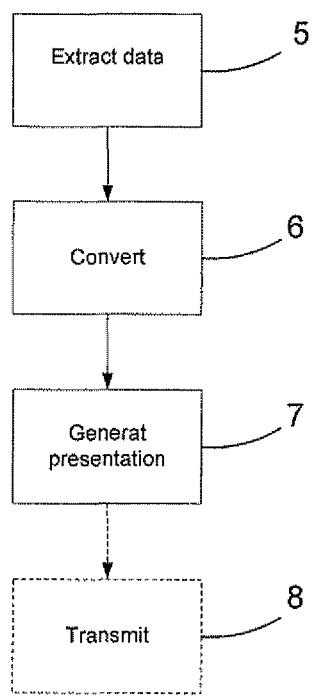
FIG. 5 is a flow diagram representing an exemplary method in accordance with one embodiment of the present invention.

FIG. 5 illustrates the general steps of an exemplary method. The method may include generating a multimedia presentation including one or more images:

in a first step, data corresponding to the images may be extracted;

in a second step, data may be converted to a presentable information; and in a third step, a presentation may be generated including the images and the presentable information provided with description. Other steps may performed.

An additional step (8) of transmitting data using a messaging function, such as e-mail and/or MMS, may also be performed.

Figure 2:
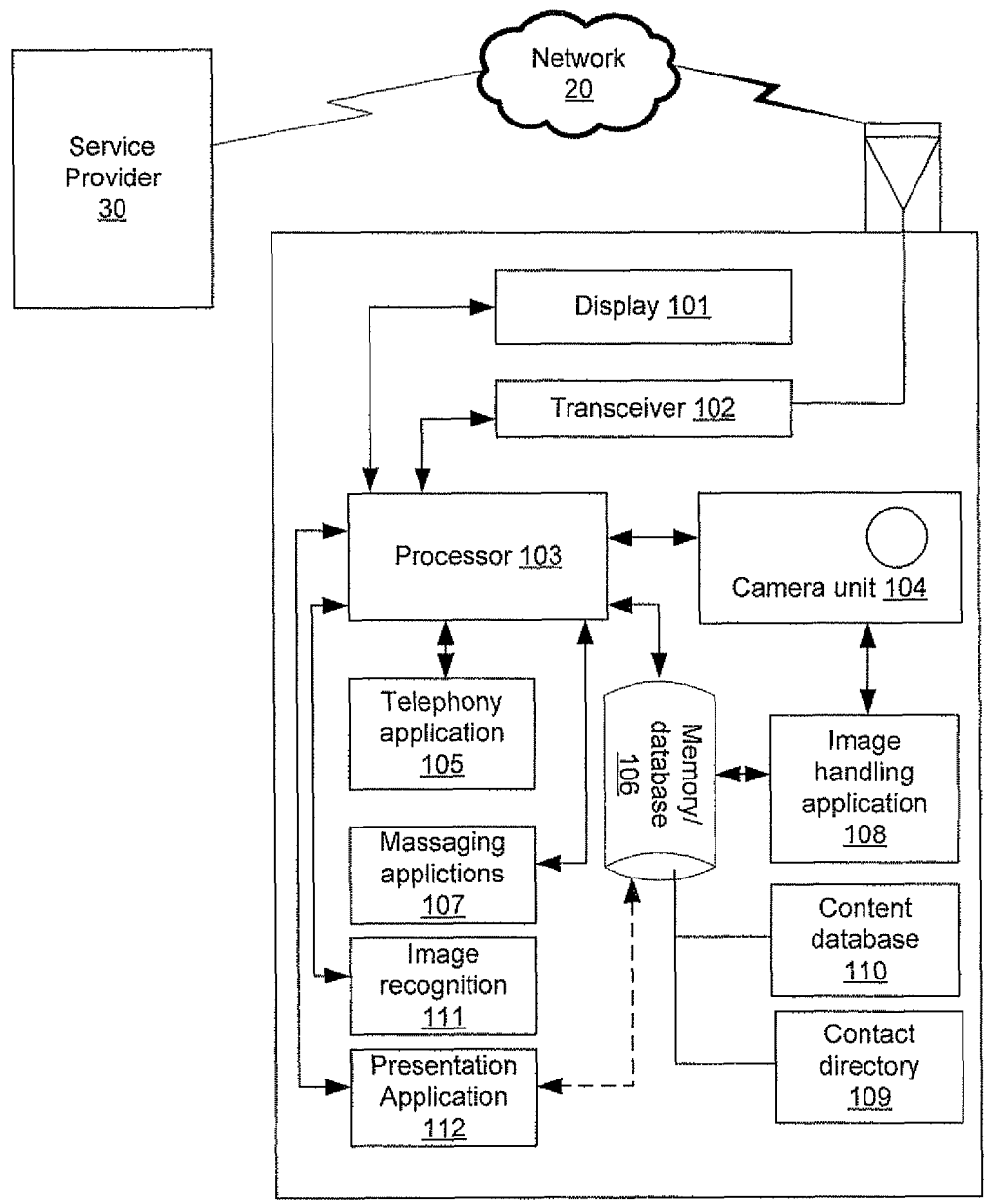
FIG. 2 is a diagram representing an exemplary mobile device implementing a photograph management system in accordance with one embodiment of the present invention.

With reference to FIG. 2, an exemplary device 100, embodied in a mobile telephone, mobile PDA, or other mobile device, is illustrated. Mobile device 100 may include a processing unit 103 for running applications and/or controlling various components and/or operation, which will be described in more detail below. A memory unit 106 may be arranged to store data and/or instruction sets for executing various functions of device 100.

Device 100 may include a transceiver portion 102 to connect to a network communication system and a telephony application 108 and/or a messaging applications 107 for communication with other devices over a wide area network with which the transceiver is compatible. In the exemplary embodiment, a wide area network 20 may be any combination of a wireless telephone service provider network, an Internet service provider (ISP) network, a wide area data network, and/or the public Internet.

Device 100 may include a contact directory 102 which may include a plurality of contract records. Each contact record may include a number of defined contact information fields, such as a person's name, an address, a telephone number, an email address, a text message address, a birth date, and/or other information. Contact directory 102 may serve the purpose of providing a network address (e.g., a telephone number, an email address, a text address, and/or other identifier) associated with the person identified in the corresponding contact record, to enable telephony application 105 and/or messaging application 107 to initiate a communication (message or session) to the network address via transceiver 102. Contact directory 102 may be implemented as a portion of memory unit 106, or independently thereof.

Device 100 may include a digital camera system 104, a photograph management application 108, and/or a content database 110. Content database 110 may be implemented as a portion of memory unit 106, or independently thereof.

In general, digital camera system 104 may be used for capturing a digital photograph and photograph management application 108 may i) obtain an information record including information related to the digital photograph; and ii) associate (e.g., embed) at least a portion of the information related to the digital photograph, as text-based metadata, with the captured photograph. The information record may be obtained from any combination of content directory 109, content database 110, and/or a remote source, such as a content database operated by a remote directory server. The text-based metadata may identify content depicted in the digital photograph, such that a collection of photographs can be readily searched and/or sorted based on the corresponding content description (e.g., searched or sorted using the metadata).

Device 100 may include an image recognition application 111 and/or presentation application 112, the functions of which will be described in more detail below.

According to an embodiment of the invention, information stored in device 100 may be used to enhance a presentation of one or more images, for example, photos in device 100 using presentation application 112. The information may be gathered from a number of different sources, for example, from metadata stored in the captured image; from information in the mobile device that can be related to the image, e.g., from the contact directory; and/or from information that can be extracted from the image, e.g., the identity of a person.

This information may then be used when presenting the photos, for example, a voice narrative associated with the presentation.

Such a presentation may easily be adapted to a message, such as an e-mail and/or an MMS to create a superior user experience. Each of a select number of pictures may be presented, for example, in one (or more) MMS slide(s) with, for example, narration, in text format and/or added to the slides as an audio-video file. By the simple press of a key and/or other user input (e.g., voice command), the user may obtain a rich MMS message. The function may be executed automatically, for example, as an option for MMS transmission.

Each image may be stored together with corresponding descriptive information available from device 100. The readily accessible information includes the information already stored in the image data, such as the time and date when photograph was captured and/or the physical location where the photograph was captured. The location may be stored in photographs captured by a GPS-enabled device and/or network positioning information.

The second source of the information is information that may be stored in the device 100. Any information related to the photo can be associated with the photo and used in presentation of the photo.

Calendar and/or Event Information

For example, if the user marks the entire day with a meeting called "Vacation" that can be used to narrate that the picture was taken during a vacation. If the user has no meetings or appointments booked that day, but usually has meetings or appointments, the narration could be that the picture was taken during a day off.

Distance Measurement e.g. Through Positioning or Step Counter Information

Information regarding how long a user has walked the day the photo was taken. It can be combined with other information, for example, in a picture two people are sitting down and the step counter indicated that the user walked 20000 steps that day, the narration could be that this was one of the few times we rested that day.

Messaging

If the picture has been sent that could be narrated and recipient frequency can be used. For example: "This picture has been sent to Arnold and Sylvester, but not to Dolph." The picture was sent to Arnold and Sylvester, but Dolph, which is the most frequent recipient of messages sent from the device, has not received the message.

The third source of information is information that can be extracted from the image itself, for example:

Face Recognition

Face recognition technology may be used to match people in a photo with, for example, the faces stored for contacts in the phone book and/or a database in the network and/or community, such as Facebook®, Flickr®, MSN®, etc. If there is a match, the narration can automatically state names taken from the contact information.

Smile Detection

Smile detection may be used to deduce if the subjects appear to be happy in a photo, and this can be automatically narrated. Other characteristics of the subjects may be deduced.

Pose Detection

Detect the pose of a person in the photograph to automatically determine and narrate the context of the photo, for example, if a person is running, sitting down, sleeping, etc.

Background Detection

Detect recognizable architecture and/or landmarks in the background of the picture, for example, narration can automatically describe that the picture is taken in front of Fontana Di Trevi in Rome, the Washington Monument in Washington, D.C., etc.

The detection procedures mentioned above may be carried out in the device itself using image and/or gesture recognition application 111 or by service-provider server 30 in the network, in which case, the image may be sent to an application in the network for detection, and the corresponding data may be sent back to the device.

Data from the above-mentioned information sources may be combined to create an enhanced presentation by adding a description, in form of narration and/or textual description to the presentation. The presentation may be created in presentation application 112, for example, using logic and/or instructions, in the following referred to as an advanced presentation software (APS). After it is generated, the presentation can be stored in memory 106 directly and/or through processor 103. It could both be stored in an APS specific format and/or be stored in a standard video format such JPEG, MPEG, AVI, WMV, MOV, etc.

A presentation generated in this manner may readily be sent as an MMS message. Select ones of the pictures may be presented as slides and the narration may be added as text and/or as an audio file. If a picture includes positioning information stored in the metadata, the MMS presentation could add a separate slide with a map on which the positions are indicated. This can be used to select a few pictures from a vacation and let the APS create an advanced slideshow which can be sent.

Figure 3:
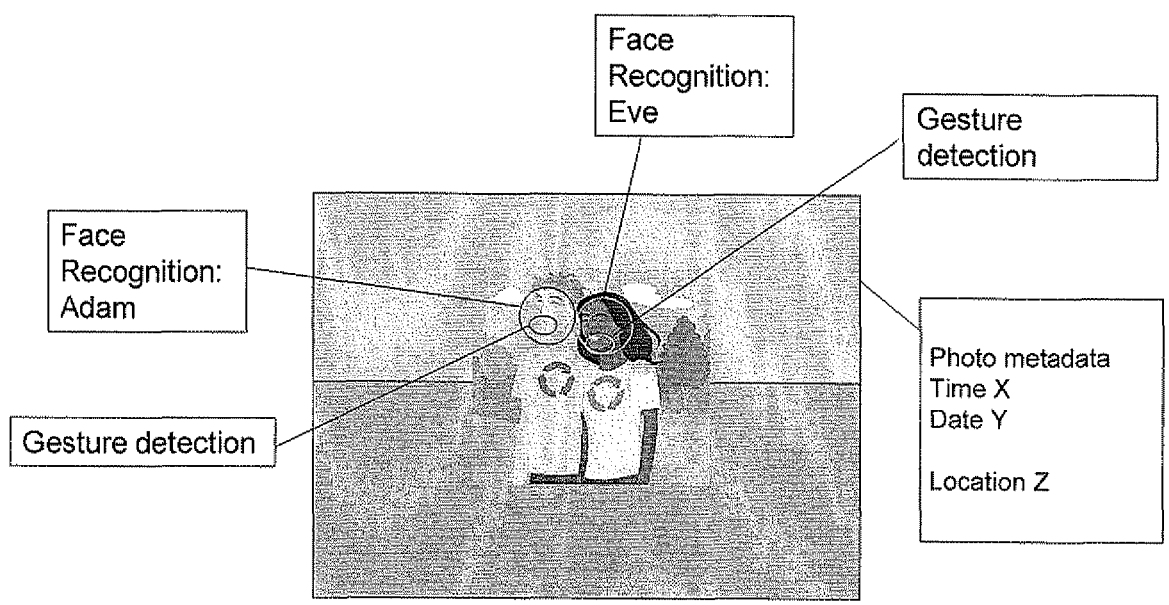
FIGS. 3 and 4 are exemplary presentation products according to the invention.

FIG. 3 illustrates a first example: Assume the picture shows the persons, Adam and Eve. The device may use face recognition to recognize Adam and/or Eve. If one of the persons is not recognized, the device may ask a user of the device to enter a name (the face image may be stored separately for additional use, for example, in the contact list). A gesture recognition program may be used to detect, for example, a smile on one or both of their faces. Photo metadata, including time and date, may be used to detect, for example, by comparing with the calendar, data to provide a specific event, such as a birthday and/or other anniversary.

Then a presentation may be generated: "Adam and Eve celebrating Eve's 19th birthday".

Figure 4:
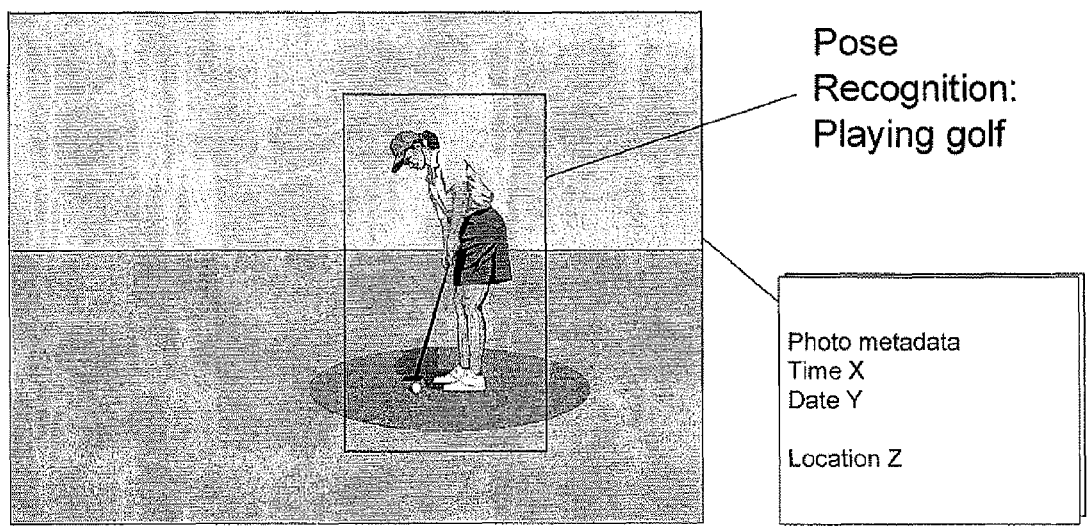

FIG. 4 is another example: Assume that the picture shows a person playing golf (putting). A gesture recognition application may determine that the pose is an active one, such as a golf pose, and photo metadata, including one or more of time and date and/or location information (received by a positioning application) may be used to detect, for example, a specific date and a locale. In this case, the locale may be determined to be a particular golf course, based on identifying landmarks, for example, peculiar to the particular golf course.

Based on the obtained information, a presentation may be generated: "Putting on the green at hole 9 at Fantasy Golf Course on Sunday during the Make-A-Wish charity golf tournament."

Other Examples

Martin selects 3 photographs and selects to create an advanced presentation. The APS searches for information related to the pictures and prepares a presentation from the information that is located.

Picture 1: A photo of two people posing for the camera. Picture 1 Narration: "Marie and I on our second day of vacation in Rome." Presentation breakdown: The faces of Martin and Marie were matched to those of the contacts for Marie and "me" in the phone book. The device calendar had a 10 day meeting called "vacation," and the date of the picture was the second day into this period. The position information stored in the metadata for the picture was identified as "Rome."

Picture 2: A photo of a woman sitting down at a table sipping a beverage. Picture 2 Narration: "A well-deserved afternoon break after a morning of long walking." Presentation breakdown: Marie is identified in the picture. The APS detects a sitting person in the photo and the step counter had registered 24,234 steps taken that day up to the point of capturing the photo, and the time stamp information may be used and/or the determined positioning of a sunset in the photo.

Picture 3: A photo of a smiling woman in front of the Coliseum in Rome. Picture 3 Narration: "Marie, happy to be standing in front of the Roman Coliseum." Presentation breakdown: APS identifies Marie in the photograph and detects a smile or a substantially similar facial expression. The background in the photograph is analyzed by APS and it is identified as the Roman Coliseum.

It should be noted that the words "comprise" and "comprising" do not exclude the presence of other elements or steps than those listed and the words "a" or "an" preceding an element do not exclude the presence of a plurality of such elements. It should further be noted that any reference signs do not limit the scope of the claims, that the invention may be implemented at least in part using both hardware and software, and that several "means," "units," or "devices" may be represented by the same item of hardware.

The above-mentioned and described embodiments are only given as examples and should not be limiting to the present invention. Other solutions, advantages, uses, objectives, and functions within the scope of the invention as claimed in the below described patent claims should be apparent for the person skilled in the art.

What I claim is:

1. An arrangement for use in a device, the arrangement configured for generating a presentation related to one or more images, the arrangement comprising:
   an image retrieval portion, implemented at least partially in hardware, to retrieve the one or more images from an image source;
   a data gathering portion, implemented at least partially in hardware, to fetch data corresponding to the one or more images and convert the data into a presentable format,
      wherein the data corresponding to said one or more images comprises metadata and information automatically extracted from the one or more images comprising data obtained through the one or more images,
      wherein the data obtained through the one or more images includes at least one of information to determine an identity of a person depicted in the one or more images, information to determine a mood of the person depicted in the one or more images, information to determine a pose of the person depicted in the one or more images, or information to determine a view depicted in the one or more images; and
   a generating portion, implemented at least partially in hardware, to:
      determine a description of the one or more images based on the at least one of the information to determine the identity of the person, the information to determine the mood of the person, the information to determine the pose of the person, or the information to determine the view, and
      generate the presentation including the one or more images and the converted data provided with the description of the one or more images,
         wherein the presentation comprises a visual description of the one or more images.

2. The arrangement of claim 1, where the data corresponding to said one or more images further comprises at least one of:
   metadata from the one or more images, or
   information from the device identifying a date and/or time associated with the one or more images.

3. The arrangement of claim 2, where the metadata comprises at least one of time, date, or geographical location information.

4. The arrangement of claim 2, where the information from the device comprises at least of calendar information at a time corresponding to the one or more images or distance measurement information.

5. The arrangement of claim 1, where the data obtained through the one or more images further includes activity recognition information.

6. The arrangement of claim 1, where the presentation further comprises an audio description of the one or more images.

7. A communication device comprising:
   a processing unit;
   a memory device;
   a transceiver;
   a telephony application;
   a contact directory;
   a messaging application;
   a digital camera system;
   a photograph management application;
   a content database;
   a portion for retrieving one or more images from the digital camera system and/or the memory device;
   a portion for fetching data corresponding to the one or more images and converting the fetched data to presentable information,
      wherein the data corresponding to said one or more images comprises metadata and information automatically extracted from the one or more images comprising data obtained through the one or more images,
      wherein the data obtained through the one or more images includes at least one of information to determine an identity of a person depicted in the one or more images, information to determine a mood of the person depicted in the one or more images, information to determine a pose of the person depicted in the one or more images, or information to determine a view depicted in the one or more images;
   a portion for determining a description of a content of the one or more images based on the at least one of the information to determine an identity of the person, the information to determine the mood of the person, the information to determine the pose of the person, or the information to determine the view; and a portion for generating assembly information comprising the one or more images, the presentable information, and the description of the content of the one or more images generated based on the presentable information, wherein the assembly information comprises a visual description of the one or more images.

8. The device of claim 7, where the data obtained through the one or more images includes the information to determine the identity of the person depicted in the one or more images, the device further comprising:

a face recognition portion to generate the information to determine the identity of the person depicted in the one or more images.

9. The device of claim 7, where the data obtained through the one or more images includes the information to determine the view depicted in the one or more images, the device further comprising:

a portion for providing geographic location information to generate at least some of the information to determine the view depicted in the one or more images.

10. The device of claim 7, where the data obtained through the one or more images includes at least one of the information to determine the mood of the person depicted in the one or more images, the information to determine the pose of the person depicted in the one or more images, or the information to determine the view depicted in the one or more images, the device further comprising:

a portion for providing calendar information to generate at least some of the at least one of the information to determine the mood of the person depicted in the one or more images, the information to determine the pose of the person depicted in the one or more images, or the information to determine the view depicted in the one or more images.

11. The device of claim 7, further comprising a step counter to generate at least some of the fetched data.

12. The device of claim 7, further comprising an arrangement for generating a multimedia message based on the assembly information.

13. The device of claim 7, where the data obtained through the one or more images includes the information to determine the pose of the person depicted in the one or more images, the device further comprising:

a gesture recognition portion to generate at least some of the information to determine the pose of the person depicted in the one or more images.

14. The device of claim 7, where the data obtained through the one or more images includes the information to determine the view depicted in the one or more images, the device further comprising:

a view detection portion to generate at least some of the information to determine the view depicted in the one or more images.

15. A method for enhanced presentation of one or more images, the method comprising:

locating, by a device, data corresponding to the one or more images and converting the data corresponding to the one or more images to a descriptive information that describes a content of the one or more images, wherein data corresponding to said one or more images comprises metadata and information automatically extracted from the one or more images comprising data obtained through the one or more images, wherein the data obtained through the one or more images includes at least one of information to determine an identity of a person depicted in the one or more images, information to determine a mood of the person depicted in the one or more images, information to determine a pose of the person depicted in the one or more images, or information to determine a view depicted in the one or more images; and generating, by the device, the presentation including the one or more images and the descriptive information,
wherein the presentation comprises a visual description of the one or more images.

16. The method of claim 15, where the data corresponding to the one or more images further comprises at least one of metadata embedded in the one or more images or date and time information stored in the device.

17. The method of claim 16, where the data corresponding to the one or more images includes the metadata embedded in the one or more images, and where the metadata embedded in the one or more images comprises at least one of time, date, or position.

18. The method of claim 16, further comprising:
using information comprising at least one of calendar information at a time corresponding to an acquirement of the one or more images or distance information corresponding to the acquirement of the one or more images.

19. The method of claim 15, where the data obtained through the one or more images comprises at least two of face recognition information, smile detection information, posture recognition information, activity recognition information, or view recognition information.

20. The method of claim 15, where the presentation further comprises an audio and/or a visual narrative of the descriptive information associated with the one or more images.

21. A method of generating and transmitting a digital message including multimedia information that includes one or more images, the method comprising:

extracting data corresponding to said one or more images and converting the data to presentable information, wherein data corresponding to said one or more images comprises metadata and information automatically extracted from the one or more images comprising data obtained through the one or more images, wherein the data obtained through the one or more images includes at least one of information to determine an identity of a person depicted in the one or more images, information to determine a mood of the person depicted in the one or more images, information to determine a pose of the person depicted in the one or more images, or information to determine a view depicted in the one or more images;

determining a description of the one or more images based on the at least one of the information to determine the identity of the person, the information to determine the mood of the person, the information to determine the pose of the person, or the information to determine the view;

generating a presentation comprising said one or more images and said presentable information provided with the description, wherein the presentation comprises a visual description of the one or more images; and transmitting said presentation over a network.

22. The arrangement of claim 1, further comprising:
a messaging portion to transmit the presentation, where the presentation is transmitted as a multimedia messaging service (MMS) message.

23. The device of claim 7, where the messaging application transmits the assembly information as a multimedia messaging service (MMS) message.

24. The method of claim 15, further comprising:
   transmitting the presentation as a multimedia messaging service (MMS) message.

25. The method of claim 21, where transmitting the presentation includes:
   transmitting the presentation as a multimedia messaging service (MMS) message over the network.

* * * * *